S. R. JONES.
Car Bumper.
No. 615.
Reissued Oct. 26, 1858.
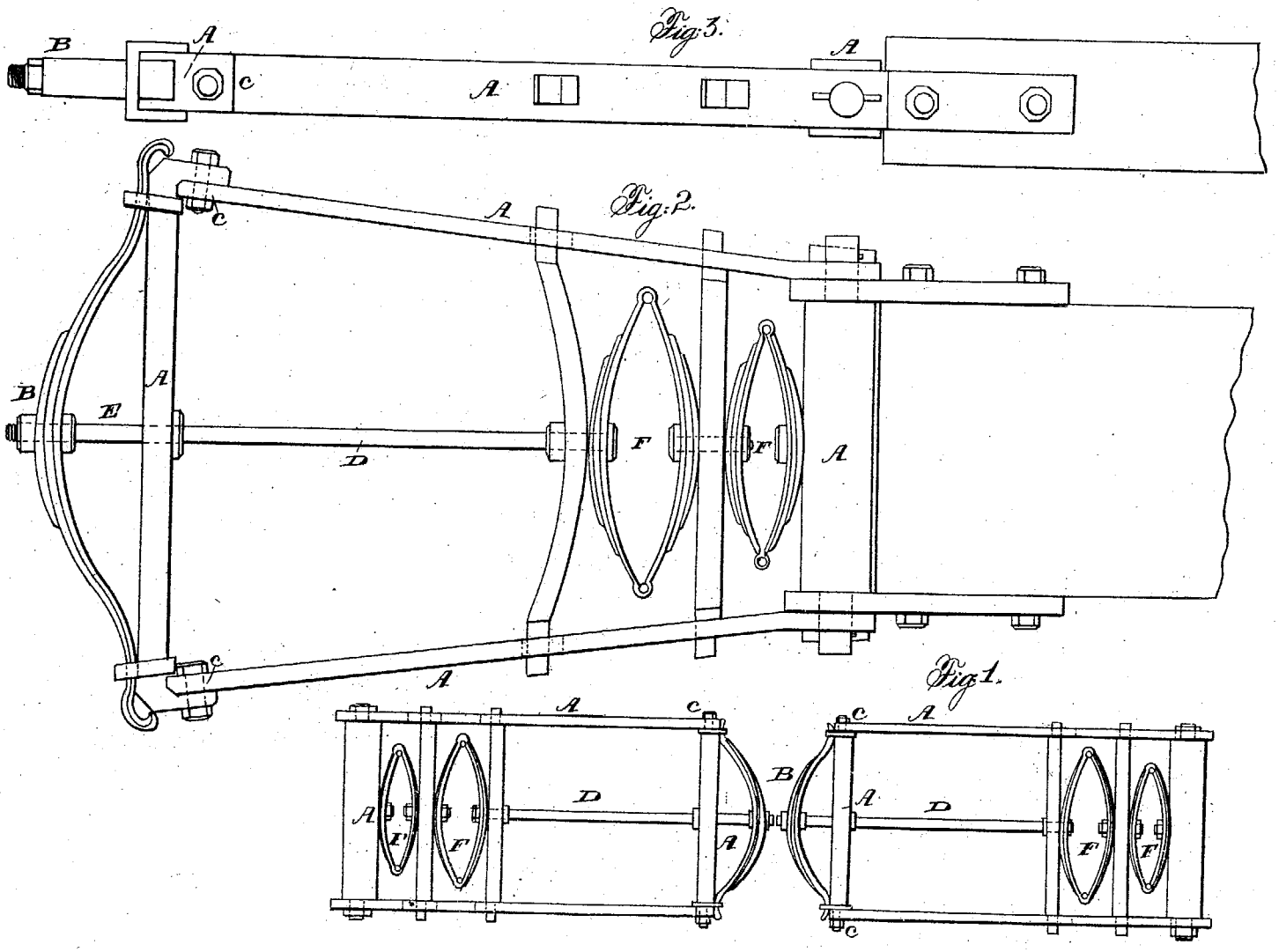

UNITED STATES PATENT OFFICE.

SAMUEL R. JONES, OF YORK, PENNSYLVANIA.

IMPROVEMENT IN ELLIPTIC CUSHIONS FOR RAILROAD-CARS.

Specification forming part of Letters Patent No. 20,070, dated April 27, 1858; Reissue, No. 615, dated October 26, 1858.

*To all whom it may concern:*

Be it known that I, SAMUEL R. JONES, of York, county of York, State of Pennsylvania, have invented an Elliptic Cushion for Easing off Collisions on Railroads—a new and improved mode of protecting railroad-cars from disasters by collisions; and I do hereby declare that the following is a full and exact description thereof, reference being had to the drawings, and to the letters of reference marked therein.

My invention consists in an oblong or square iron frame, before and within which I construct the several parts composing the elliptic cushion, which, when applied to steam-cars, will be in front projecting any distance; when applied to passenger-cars will be applied under floor, reaching from bolster to the front edge of platform, the sides lining the side plates or sills of car-frame to which the bolsters are framed.

Figure 1 represents the cushions as they will appear with the buffers antagonizing from adjoining passenger-cars in connection, reaching from the front edge of platform to bolster of car; Fig. 2, an upper view of cushion as it will appear when applied to locomotives (in front) with a gum pad for the place of contact; Fig. 3, a lateral view of cushion as applied to locomotives with the gum pad.

My specification is as follows: The letters A refer to the several parts of the iron frame. The letters B refer to the semi-elliptic buffers which span the front end or part of frame as a bridge, so as to keep the front clear and safe, with the front corners of frame C serving as abutments with bands or ties to secure ends of buffers, so as to render them tense by the pressure upon the center from within or rear, by a hollow (iron) sliding shaft, E, which passes through the front of frame, containing a gum pad, a spiral wire, both or either, to impart an elasticity to the shafts, in which I have a shaft, D, extending to one or more (series) elliptic springs, F, of various forms and sizes, which are attached to the rear part of frame to maintain a constant pressure against the shaft, which, with the elliptic springs, will serve as an elastic pier to buffer, and is intended to be appended to railroad-cars (locomotive, passenger, &c.) to obviate the jolting and jerking of cars, and to ward off the disasters threatened to and occasioned by the sudden and violent force arising from the clashing or collision of cars.

The nature and principle of my invention are as follows: The arch of the semi-elliptic at either end of cars will face and antagonize, as the usual flat, and by their elastic form and nature will afford such a rebound as to be unattended by jolting or jerking, because the ends of the buffer will be at rest except a slight sliding motion, but having a center or focus upon which to act, (the shaft,) the force alone will apply here, yet with a pressure motion like a cushion, as all the operations of the cushion will be applied and confined to the machinery in the frame, instead of being associated or connected with the timbers of the car, and consequently all the jarring sensations will be confined and spent there without allowing any to be communicated to the car, except under a very modified form; and as the thickness of the buffers at either end of car (unitedly) will occupy considerable space between platforms, these may approach, but cannot touch, and even if flattened cannot meet to endanger. The primary object and action of the semi-elliptic spring in my cushion will be to subserve the purpose of a buffer; and, secondly, in making the buffer a part of the machinery consecutively to ease off concussions, so as to be at all times cotemporaneous when needed, than if it were separated from the machinery, or more difficult and complex in the nature of the cushion or its operation. The sliding spring shaft or shafts also share their relation and parts in the machinery by bracing and sustaining the buffer, and will just in proportion to the force applied, but will not apply or conduct the force to the rear springs until the corresponding shoulders meet, when both (buffer and shafts) will be forced back upon the series to spend the violence of the collision in the cushion composed of buffer, shafts, and springs, all of which are independent of the the car and in no wise associated with it, except to suspend or hang a frame, in which all violence will be received and spent. The elliptic springs as a series or combination in form and number is the part employed to ease off the concussion mainly, as their elastic properties will be called into requisition when an emergency may occur, and even these vary in form and size, their strength and pliancy being in proportion to render them effective whenever or wherever they may operate. Of course, the machinery will be heavier and stronger if applied to a steam-car than a passenger; and if each did not vary, the first or front spring would bear all the violence without a conduction of force to a second, and so likewise from a second to a third, and so on through the series, to brace and sustain each other in sustaining the buffer, or else a second would be useless, and the one would require one to be too heavy and stiff to be sufficiently elastic to be effective.

I claim—

1. The local relation and mode of application of the semi-elliptic buffer to any and all cars wherever applied, in such manner as is represented by the letters B, and for the purposes set forth.

2. The combination and arrangement of the elliptic cushion for easing off collisions, as described, and arranged in every part thereof in the frame-work, as represented by the letters A, and operating substantially in such manner and wherever applied to cars, as described, and for the purposes set forth.

SAMUEL R. JONES.

Witnesses:
F. JAS. EVANS,
E. K. ZIEGLER.